United States Patent Office.

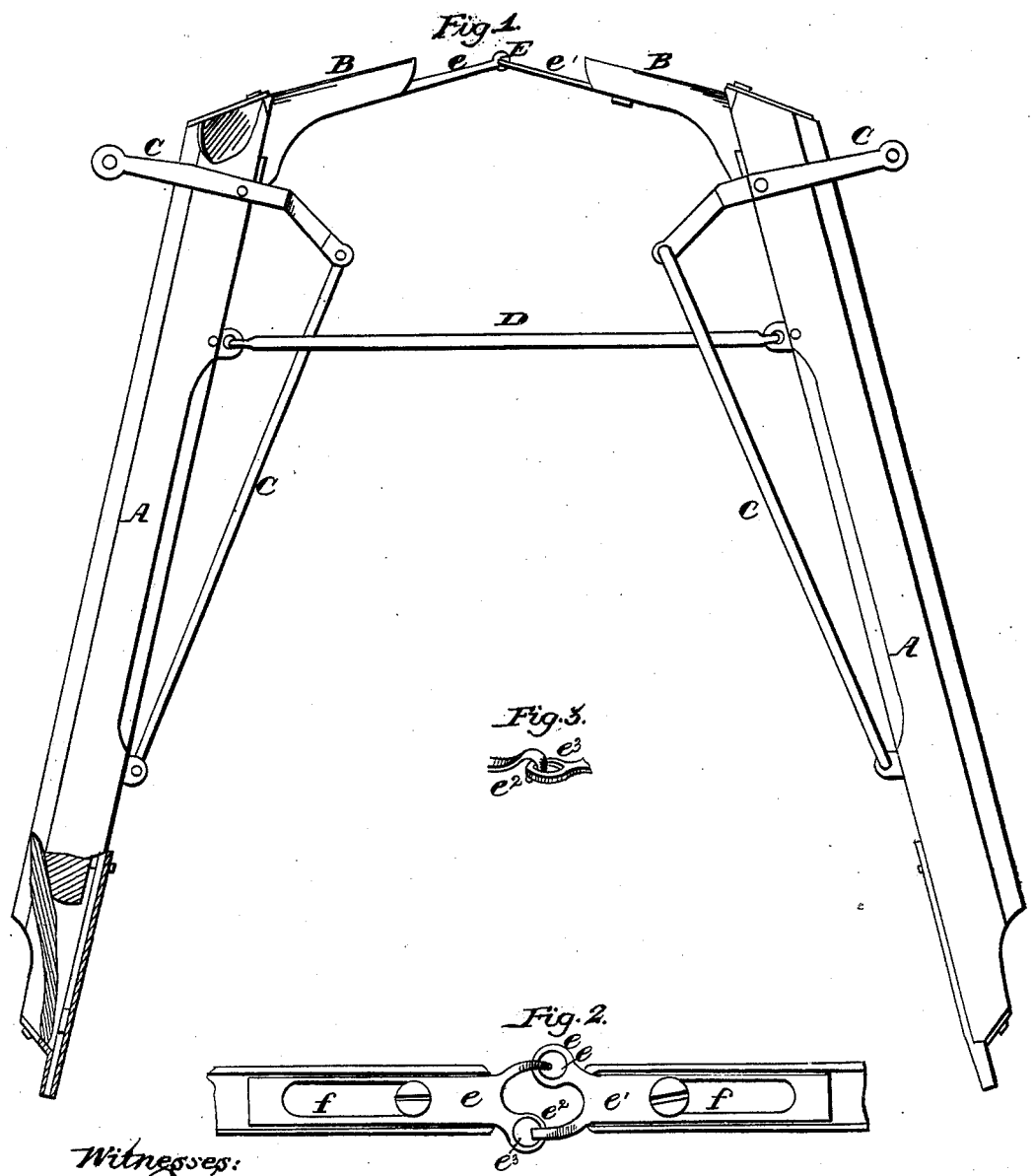

J. HERVA JONES, OF ROCKFORD, ILLINOIS.

Letters Patent No. 63,643, dated April 9, 1867.

---

IMPROVEMENT IN HAND SEED PLANTERS.

---

The Schedule referred to in these Letters Patent and making part of the same.

---

TO ALL WHOM IT MAY CONCERN:

Be it known that I, J. HERVA JONES, of Rockford, in the county of Winnebago, and State of Illinois, have invented certain new and useful Improvements in Hand Seed Planters, of which the following is a full, clear, and exact description, reference being had to the accompanying drawings, which make part of this specification, and in which—

Figure 1 represents a view in elevation of a machine embracing my improvements.

Figure 2, a view of the under side of the hinge which connects the two seeding tubes; and Figure 3, a view of the details of the hinge.

My invention relates to that class of seed planters in which two single planters are so connected as to be simultaneously operated by one movement of the workman; and my improvements consist, first, in so combining two single planters that they can be operated together or separated to work singly; second, in a novel mode of adjusting the distance between the planting points; third, in so constructing the hinges which unite the planters that one forms a counterpart for the other, so that all the leaves of the hinges may be formed from one pattern, while at the same time the two leaves of the hinge may be united by simply hooking one into the other.

In the accompanying drawings two single hand seed planters, A, are shown, as provided with thrusting handles B, and with planting levers C, which work the planting slides. These parts, it will be observed, are independent of each other. When used together the planters are connected by a link or cross-bar, D, near their upper ends, and by a hinge, E, at top. This hinge I prefer to make of malleable iron, and of the form shown in the drawings, its leaves, $e$ $e^1$, being formed exactly alike, and united by interlocking the hook $e^2$ of one into the eye $e^3$ of the other, and clamping them together by closing the hooks. The leaves are cast with slots, $f$, into which set-screws F, on the under side of the handles B, enter for the purpose of varying the distance between the planters. The planters are separated by removing one of the screws F and link D. I deem it unnecessary here to describe in detail the details of construction of the planting devices, as they form no part of the subject-matter herein claimed.

It will be seen by the foregoing description that by my improvement I am enabled to use the planters either singly or in pairs, that I can at pleasure adjust the distance between the planting points, and that I form both leaves of the hinge in one mould, and unite them without a pivot pin, and also avoid the necessity of drilling holes in the hinge.

What I claim as my invention, and desire to secure by Letters Patent, is—

1. The combination of two single hand seed planters for joint operation, by means of the fulcrum link or cross-bar and the adjustable hinge, arranged and operating as described.

2. The combination of the thrusting handles with the slotted hinge and adjusting screws, when constructed and arranged as described.

3. The hinge constructed of two leaves, each the counterpart of the other, and united by interlocking their hooks and eyes for the purpose of dispensing with a pivot pin, and of securing economy of construction, as set forth.

In testimony whereof I have hereunto subscribed my name.

J. HERVA JONES.

Witnesses:
BYRON GRAHAM,
JOHN FAXON.